UNITED STATES PATENT OFFICE

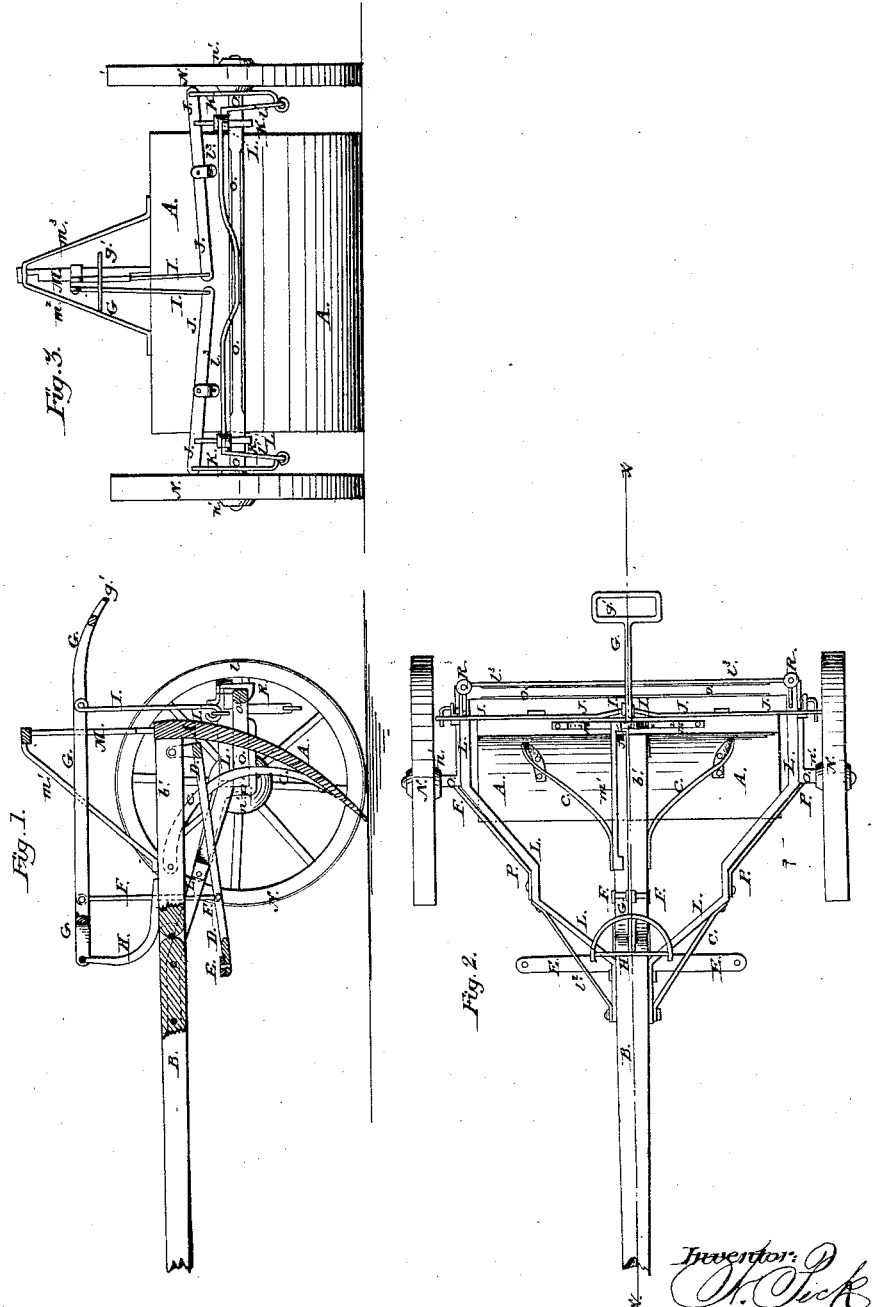

NELSON PECK, OF JAY, NEW YORK.

IMPROVED EARTH-SCRAPER.

Specification forming part of Letters Patent No. 57,757, dated September 4, 1866.

*To all whom it may concern:*

Be it known that I, NELSON PECK, of Jay, Essex county, and State of New York, have invented a new and useful Improvement in Earth-Scrapers; and I do hereby declare that the following is a full, clear, and exact description thereof, which will enable others skilled in the art to make and use the same, reference being had to the accompanying drawings, forming part of this specification, in which—

Figure 1 is a vertical section of my improved scraper, taken through the line $x$ $x$, Fig. 2. Fig. 2 is a top view of the same. Fig. 3 is a rear view of the same.

Similar letters of reference indicate like parts.

My invention has for its object to furnish an improved scraper for moving earth from one place to another in making and repairing roads, and for other purposes; and it consists, first, in the combination of the levers and bars by means of which the scraper is operated with each other and with the frame, tongue, scraper, and draft-bar, as hereinafter more fully described; second, in the combination of the wheels and axle with the frame of the scraper, when the said axle is made and attached in the manner hereinafter more fully described.

A is the scraper, which is securely attached to the rear or hinged part, $b$, of the tongue B, and which is still further secured in place by the curved braces C, the upper ends of which are attached to the hinged part $b'$ of the tongue and the lower ends to the forward side or face of the scraper, as shown in Figs. 1 and 2.

D is the draft-bar, the rear end of which is pivoted to the rear end of the part $b^2$ of the tongue, as shown in Fig. 1, and to its forward end is attached the double-tree E, to which the horses are attached.

F are guide and connecting bars, the lower ends of which are pivoted to the draft-bar D a little in front of its middle part, and their upper ends to the forward part of the lever G, as shown in Fig. 1. The forward end of the lever G is branched, and is pivoted to the T-shaped support H, the lower end of which is firmly attached to the part $b'$ of the tongue.

The lever G extends back beyond the scraper A, and terminates in a handle, $g'$, by means of which it may be operated.

I are two connecting-rods, the upper ends of which are pivoted to opposite sides of the lever G, just in the rear of the scraper A, as shown in Fig. 1.

To the lower ends of the connecting-rods I are pivoted the inner ends of the levers J, which are pivoted at or near their central parts to the rear side of the scraper A, as shown in Fig. 3.

The outer ends of the levers J are pivoted to the upper ends of the connecting-rods K, the lower ends of which are pivoted to the lower ends of the arms $e'$, projecting downward from the side of the frame L, as shown in Fig. 3.

The forward ends of the side bars of the frame L are attached to the sides of the tongue B, and their attachment may be strengthened by braces $b^2$, as shown in Fig. 3. The rear ends of the side bars of the frame L are connected and held in their proper relative position by the bar or rod $b^3$, as shown in Fig. 3.

M is an upright, attached to the central part of the upper edge of the scraper A, and having two notches formed in its side, one at the lower and the other at its upper end, as shown in Figs. 1 and 3, into which the lever G fits to hold the scraper in a raised or lowered position, as may be required.

The upper end of the upright M is sustained in position by the brace $m'$, the lower end of which is attached to the part $b'$ of the tongue and by the braces $m^2$ and $m^3$, the lower ends of which are attached to the upper edge of the scraper A.

N are the wheels upon which the scraper is transported.

O is the axle, which, after passing through the hubs $n'$, is bent at right angles, and passes back to the rear of the scraper A. It is then bent again at right angles, and passes in the rear of the said scraper, as shown in Figs. 1 and 2.

P are bars, the rear ends of which are securely attached to the shoulders of the axle O, and their forward ends are pivoted to the frame L, as shown in Fig. 2.

R are catches, by means of which the rear end of the frame L is connected to the axle O, as shown in Figs. 1 and 3.

When the catches R are so turned as not to catch upon the axle O, the wheels N will remain in contact with the ground, whether the scraper A is raised or lowered; but when the catches R are so turned as to catch upon the axle O, and the scraper A is lowered, the wheels N and axle O will be suspended from the scraper A, and will act as a weight to make the said scraper A take a better hold upon the ground. This manner of constructing the axle O and attaching it to the frame L also enables the wheels and axle to be turned forward beneath the tongue B, enabling the scraper to be backed up and operated close to the edge of a ditch, and in other situations where the wheels, if in their ordinary position, would be in the way.

It will be observed that the machine is so constructed that all that it is necessary for the driver to do in loading it is to throw the lever G out of the upper notch in the upright M. The action of the team in backing up then throws the lever into the lower notch, where it is held until it is time to unload. The lever G is then thrown out of the lower notch, and the action of the team in drawing the load immediately raises the said lever to the upper notch, lifting the scraper A and discharging the load.

For convenience in throwing the lever G out of the notches in the upright M, a bent lever having arms or elbows passing around the said notches in the upright M may be pivoted to the upper edge of the scraper A, said lever being held in place by a spring attached to the said scraper and pressing against the long arm of the lever.

I claim as new and desire to secure by Letters Patent—

1. An improved scraper, formed by combining the lever G, bars F, bars I, levers J, and bars K with each other and with the frame L, tongue B $b'$, scraper A, and draft-bar D, substantially as described, and for the purpose set forth.

2. The combination of the wheels N and axle O with the frame L of the scraper A, when the axle O is made and attached substantially as herein described, and for the purpose set forth.

NELSON $\times$ PECK.
his mark.

Witnesses:
   GEORGE G. TOBEY,
   ALEXANDER KENNEDY.